United States Patent
Doerr

[11] Patent Number: 6,141,467
[45] Date of Patent: Oct. 31, 2000

[54] WAVELENGTH-DIVISION-MULTIPLEXING PROGRAMMABLE ADD/DROP USING INTERLEAVE-CHIRPED WAVEGUIDE GRATING ROUTER

[75] Inventor: Christopher Richard Doerr, Middletown, N.J.

[73] Assignee: Lucent Technologies Inc., Murray Hill, N.J.

[21] Appl. No.: 09/040,781

[22] Filed: Mar. 18, 1998

[51] Int. Cl.[7] .................................................. G02B 6/293
[52] U.S. Cl. ............................. 385/24; 359/124; 359/127
[58] Field of Search ................................. 385/15, 24, 37, 385/46, 39, 47, 48; 359/115, 124, 127, 129

[56] References Cited

U.S. PATENT DOCUMENTS

| | | | |
|---|---|---|---|
| 5,136,671 | 8/1992 | Dragone | 385/46 |
| 5,978,532 | 11/1999 | Rigny et al. | 385/46 |

OTHER PUBLICATIONS

M. K. Smit, "New focusing and dispersive planar component based on an optical phased array," *Electronics* Letters, 24, pp. 385–386 (1988).

H. Takahashi et al., "Arrayed–waveguide grating for wavelength division multi/demultiplexer with nanometre resolution," *Electronics Letters*, 26, No. 2, pp. 87–88 (1990).

C. Dragone, "An N×N Optical Multiplexer Using a Planar Arrangement of Two Star Couplers," *IEEE Photonics Technology Letters*, 3, No. 9, pp. 812–814 (1991).

B. Glance, "Tunable Add/Drop Optical Filter Providing Arbitrary Channel Arrangements," *IEEE Photonics Technology Letters*, 7, No. 11, 1303–1305 (1995).

K. Okamoto et al., "16–channel optical add/drop multiplexer consisting of arrayed–waveguide gratings and double–gate switches," *Electronics Letters*, 32, No. 16, 1471–1472 (1996).

C. Dragone, "Optimum design of a planar array of tapered waveguides," *Journal of the Optical Society of America*, 7, No. 11, pp. 2081–2093 (1990).

L. Goke et al., "Banyan networks for partitioning multiprocessor systems," *First Annual Symposium on Computer Architecture*, pp. 21–28 (1973).

C. R. Doerr et al., "Chromatic Focal Plane Displacement in the Parabolic Chirped Waveguide Grating Router," *IEEE Photonics Technology Letters*, 9, No. 5, pp. 625–627 (1997).

E. I. Goldstein et al., "Scaling Limitations in Transparent Optical Networks Due to Low–Level Crosstalk," *IEEE Photonics Technology Letters*, 7, No. 1, pp. 93–94 (1995).

M. Shirasaki, "Large angular dispersion by a virtually imaged phased array and its application to a wavelength demultiplexer," *Optics Letters*, 21, No. 5, Mar. 1996.

Primary Examiner—John D. Lee
Assistant Examiner—Michelle R. Connelly-Cushwa
Attorney, Agent, or Firm—J. J. Brosemer

[57] ABSTRACT

A Wavelength-Division-Multiplexer (WDM) programmable add/drop using an interleave-chirped waveguide grating router and phase shifters in a reflective arrangement. Experimental results of a 16×100-GHz version in InP is presented.

16 Claims, 11 Drawing Sheets

TABLE 1

| P | ARM LENGTH CHANGE SERIES [$\lambda_c$] |
|---|---|
| 2 | $\frac{1}{4}$, 0 |
| 3 | $\frac{1}{3}$, 0, 0 |
| 4 | $\frac{1}{2}$, 0, 0, 0 |
| 5 | $\frac{1}{5}$, $\frac{3}{5}$, $\frac{1}{5}$, 0, 0 |
| 6 | $\frac{3}{4}$, $\frac{1}{3}$, $\frac{3}{4}$, 0, $\frac{1}{12}$, 0 |
| 7 | $\frac{1}{7}$, $\frac{3}{7}$, $\frac{6}{7}$, $\frac{3}{7}$, $\frac{1}{7}$, 0, 0 |
| 8 | $\frac{1}{4}$, $\frac{1}{2}$, 0, $\frac{1}{2}$, $\frac{1}{4}$, 0, 0, 0 |

WAVELENGTH-DIVISION-MULTIPLEXING PROGRAMMABLE ADD/DROP USING INTERLEAVE-CHIRPED WAVEGUIDE GRATING ROUTER

FIELD OF THE INVENTION

This invention relates to Wavelength-Division-Multiplexers (WDMs) and, more particularly, to a WDM programmable add/drop using an interleave-chirped waveguide grating router.

BACKGROUND OF THE INVENTION

A Wavelength-Division-Multiplexing (WDM) cross-connect (a non-wavelength-changing one) is a device that can exchange any wavelength channel in any line with the same wavelength channel in any other line. The conventional design is to use a matrix of switches between sets of wavelength multiplexers, such as Waveguide Grating Routers (WGRs). For example see the publications

[1] M. K. Smit, "New focusing and dispersive planar component based on an optical phased array," Electron. Lett., vol. 24, pp. 385–386 (1988);

[2] H. Takahashi, S. Suzuki, K. Kato and I. Nishi, "Arrayed-waveguide grating for wavelength division multi/demultiplexer with nanometer resolution," Electron. Lett., vol. 26, pp. 87–88 (1990); and

[3] C. Dragone, "An N×N optical multiplexer using a planar arrangement of two star couplers," *IEEE Photon. Technol. Lett.*, vol. 3, 812–814 (1991).

For 2 line×2 line versions, designs have been demonstrated with discrete components {e.g., see B. Glance, "Tunable add drop optical filter providing arbitrary channel arrangements," *IEEE Photon. Technol. Lett.*, vol. 7, 1303–1305 (1995)} and with fully integrated components {e.g., see K. Okamoto, M. Okuno, A. Himeno, and Y. Ohmori, "16-channel optical add/drop multiplexer consisting of arrayed-waveguide gratings and double-gate switches," *Electron. Lett.*, vol. 32, 1471–1472 (1996)}.

Notwithstanding these advances in the design of WDMs, there is a continuing need for WDM devices which facilitate the transmission and management of optical signals.

SUMMARY OF THE INVENTION

In accordance with the present invention, a Wavelength-Division-Multiplexer (WDM) programmable add/drop is made using an interleave-chirped waveguide grating router and phase shifters in a reflective arrangement.

More particularly A Wavelength Division Multiplexing (WDM) programmable add/drop device comprising waveguide grating router, a phase shifter unit and a reflective unit are optically connected. This arrangement allows the dropping and adding of optical channels from and to an optical transmission line. Additionally, the arrangement allows for control of relative power of channels passing through the device.

DETAILED DESCRIPTION

In the following description, each item or block of each figure has a reference designation associated therewith, the first number of which refers to the figure in which that item is first located (e.g., 110 is first located in FIG. 1).

Figure 1:
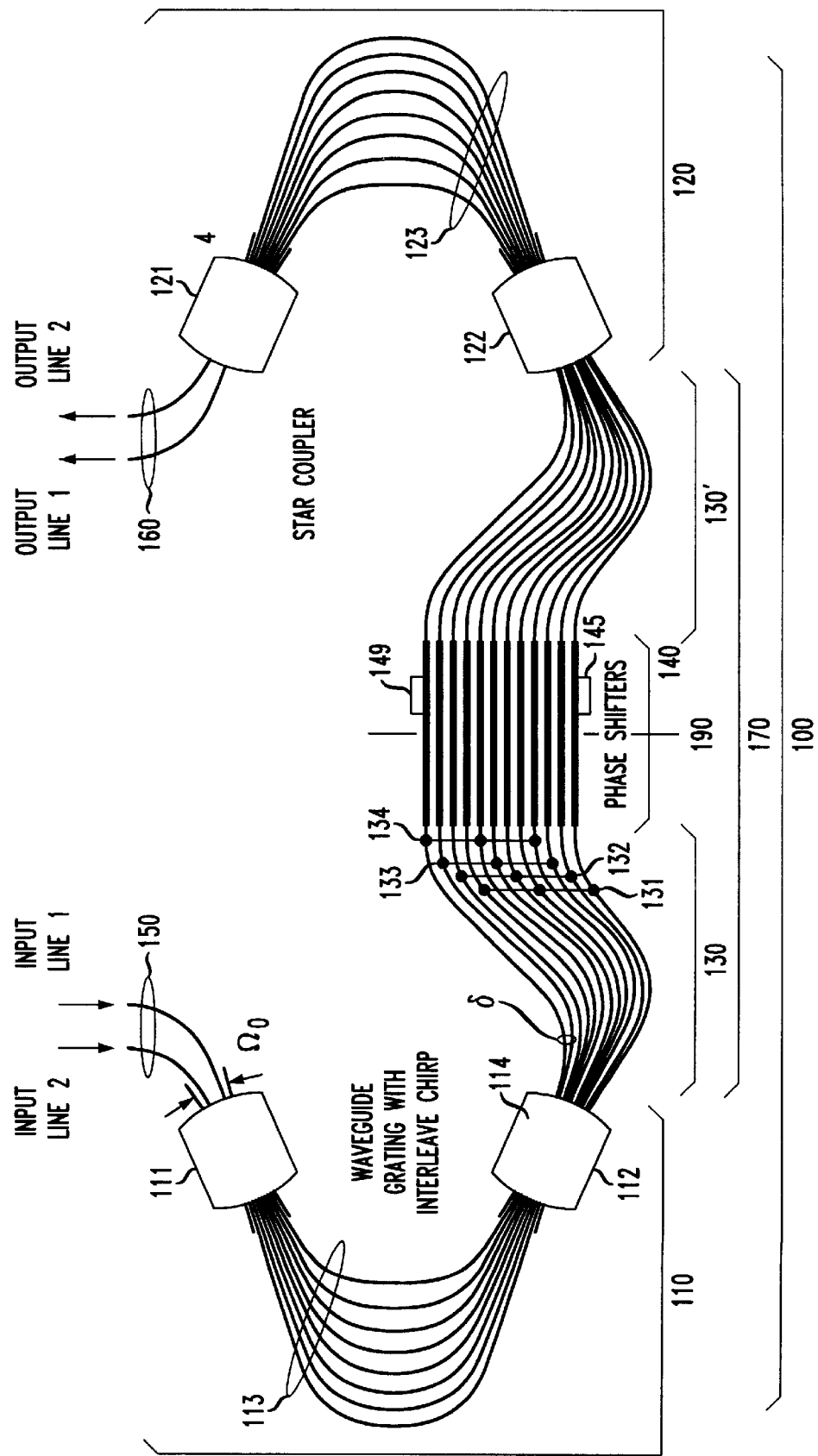
FIG. 1 shows an illustrative diagram of a reconfigureable wavelength-division-multiplexing (WDM) cross-connect comprising two "interleave-chirped" waveguide grating routers (WGRs) connected by a phase shifter unit.

Shown in FIG. 1 is an illustrative diagram of a reconfigureable wavelength-division-multiplexing (WDM) cross-connect 100 comprising two "interleave-chirped" waveguide grating routers (WGRs) 110 and 120 connected by a phase shifter unit 170 which includes a waveguide arrays 130 and 130' and a phase shifter array 140. The WDM cross-connect 100 can be monolithically integrated with no waveguide crossings and theoretically can achieve very high switching extinction ratios and a nearly excess-loss-free rectangular spectral response.

A plurality of optical lines, e.g., lines 1 and 2, may be connected as the input lines (or input ports) 150 and output lines (or output ports) 160 of WDM cross-connect 100. Each of the lines 1 and 2 may carry a plurality of wavelength channels. For the 2 line×2 line case shown in FIG. 1, any wavelength channel in one line. e.g., line 1, can be exchanged with the same wavelength channel in the other line, i.e., line 2. For the more general P line×P line case, where P=2, the channels can be switched in a cyclical fashion between lines. The WDM cross-connect 100 can be implemented as a compact device with no waveguide crossings; can theoretically achieve very high, fabrication-tolerant, switching extinction ratios; and can theoretically achieve a nearly excess-loss-free rectangular spectral response.

Each of the two "interleave-chirped" WGRs 110 and 120 are formed from two star couplers, e.g., 111 and 112, connected by an array of grating arms, e.g., 113. Such WGRs may be of the type described in U.S. Pat. No. 5,136,671, issued to C. Dragone on Aug. 4, 1992 or the above-identified Dragone article, both of which are incorporated by reference herein.

For any multiple wavelength signal received over each of the input lines 1 and 2, the operation of WGR 110 causes all signal wavelengths which are the same to be directed to the same output waveguide of arrays 130 and 130'. Consequently, each of the different wavelengths of input line 1 is received in free space region 114 and directed, according to wavelength, to a particular group of one or more of the waveguides of arrays 130 and 130'. Similarly, each of the different wavelengths of input line 2 (if spaced within the same Brillouin zones $\Omega_0$ as input line 1) is received in free space region 114 and directed, according to wavelength, to a particular group of one or more of the waveguides of arrays 130 and 130'. Thus in FIG. 1, if we assume that the signal on line 1 includes four wavelength channels $\lambda 1$, $\lambda 2$, $\lambda 3$, and $\lambda 4$ each of the wavelengths would be directed to a different group of waveguides 131, 132, 133, and 134, respectively, of array 130.

In accordance with the present invention, for P=2 input and output lines (lines 1 and 2) the WGR 110 (and 120) are provided with an "interleave chirp" which consists of giving every other grating arm of array 113 (and 123) an additional path length of $\lambda_c/4$, where $\lambda_c$ is the wavelength of interest in the waveguide ($\lambda_c = \lambda_{c0}/n$). The additional path length of $\lambda_c/4$ produces a delay or phase shift of $\pi/2$, or 90 degrees. The radiation patterns from the arrays of waveguide grating arms, e.g., 113, in the star couplers 111 and 112 of WGR 110 have Brillouin zones $\phi_i$ of order i and width $2\gamma$ [e.g., see the article by C. Dragone, "Optimum design of a planar array of tapered waveguides," *J. Opt. Soc. Am. A*, vol. 7, pp. 2081–2091 (1990)]. The interleave chirp makes the WGRs create two images for each wavelength in each $\Omega_i$, the images spaced by $\gamma$. This can be understood from the following: consider a non-chirped WGR. Single-wavelength (or frequency) signals entering an input port, e.g., input line 1, in one star coupler 111 of the WGR 110 are imaged to $\Omega_0$ in the free space region 114 of the other star coupler, i.e., 112.

Figure 2:
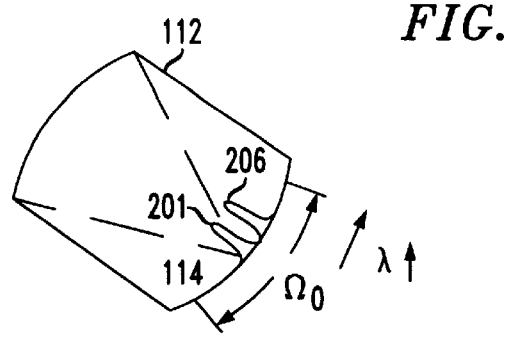
FIG. 2 shows an illustrative image being focused in a Brillouin zone $\Omega_0$ of the free space region of a star coupler of a standard WGR.

With reference to FIG. 2, there is shown a $\lambda 1$ signal image 201 being focused in Brillouin zone $\Omega_0$ of the free space region 114 of star coupler 112 of a standard "non-chirped" WGR. While in our example the image was derived for a $\lambda 1$ signal received on input line 1, a $\lambda 1$ signal received over input line 2 would generate the same image 206. It should also be noted that a longer wavelength $\lambda 2$ entering line 1 would produce the image 206 in Brillouin zone $\Omega_0$. To better understand how the image 201 is formed, we consider FIGS. 3 and 4.

Figure 3:
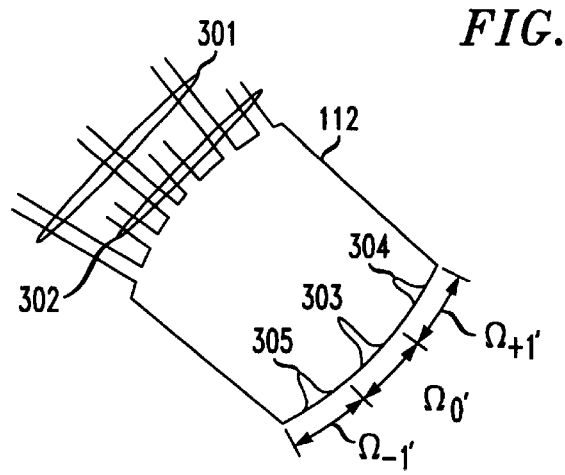
FIG. 3 shows the images from input line 1 at a free space region of a star coupler when all the even-numbered grating arms remain and the odd-numbered grating arms are removed.

Shown in FIG. 3 is a star coupler 112 where all of the even-numbered grating arms 301 to star coupler 112 remain and the odd-numbered grating arms 302 are removed. In such a modified coupler, the new Brillouin zones $\Omega_0'$, $\Omega_{+1}'$ and $\Omega_{-1}'$ are half the size of those of FIG. 2, and there is an image 303, 304, and 305, respectively, in each $\Omega_0'$, $\Omega_{+1}'$ and $\Omega_{-1}'$, and all of the images have the same phase.

Figure 4:
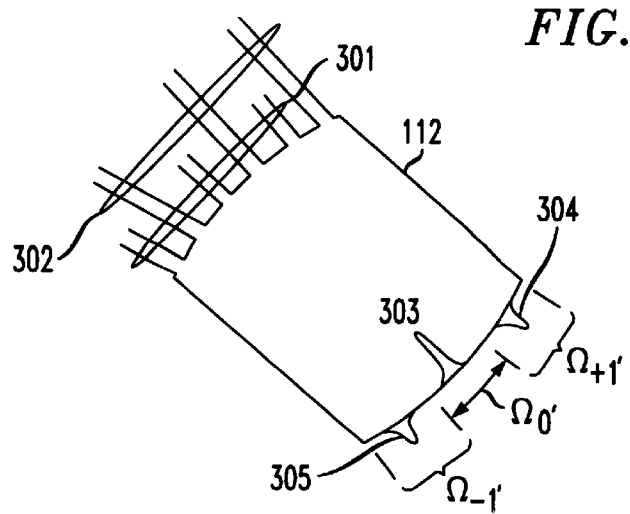
FIG. 4 shows the images from input line 1 at a free space region of a star coupler when all the odd-numbered grating arms remain and the even-numbered grating arms are removed.

Shown in FIG. 4 is the effect of putting-back the odd-numbered arms 302 and removing the even-numbered arms 301. The same Brillouin zones $\Omega_0'$, $\Omega_{+1}'$ and $\Omega_{-1}'$ and same images 303, 304, and 305 result, except that the images in the odd-order Brillouin zones $\Omega_{+1}'$ and $\Omega_{-1}'$ are 180° out of phase.

It should be noted that when all the grating arms 301 and 302 are present, i.e., the FIG. 2 case, the images from the even- and odd-numbered arms add constructively in the even-order Brillouin zones $\Omega_i'$(i.e., $\Omega_0'$), and destructively in the odd Brillouin zones $\Omega_i'$(i.e., $\Omega_{+1}'$ and $\Omega_{-1}'$), resulting in only one image in each of the even-order Brillouin zones $\Omega_i$(i.e., $\Omega_0'$). With reference to FIG. 2 again, the resulting image is shown as image 201 in Brillouin zone $\Omega_0$.

Figure 5:
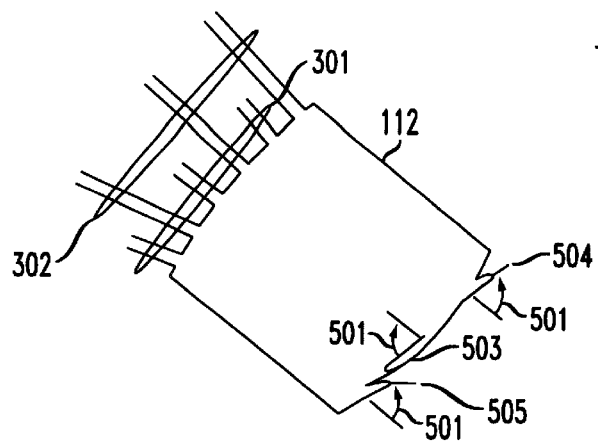
FIG. 5 shows the images from input line 1 at a free space region of a star coupler when all the odd-numbered grating arms are lengthened to include an additional 90° phase rotation and the even-numbered grating arms are removed.
Figure 6:
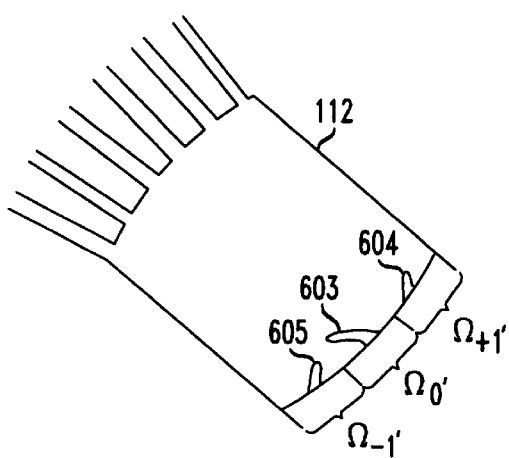
FIG. 6 shows the combined images from FIG. 3 and FIG. 5 at the free space region of a star coupler when all the odd-numbered grating arms are lengthened to include an additional 90° phase rotation.

With reference to FIG. 5, in accordance with the present invention, when an "interleave chirp" is added to the odd-order grating arms 302, the phases of the odd-order grating arms 302 are phase shifted or rotated by $\pi/2$. As shown in FIG. 5, the resulting images in the Brillouin zones $\Omega_i'$(i.e. $\Omega_0'$, $\Omega_{+1}'$ and $\Omega_{-1}'$) are counter-clockwise rotated by $\pi/2$ (90 degrees) 501, as shown by the images 503, 504, and 505. Consequently, when a WGR is formed having all of its grating arms 302 connected as shown in FIG. 6, its images 603, 604, and 605 are formed by combining the images 503, 504, and 505 of FIG. 5 with the images 303, 304, and 305 of FIG. 3. Note that when the images 504 and 505 of the odd-order Brillouin zones of FIG. 5 are combined with the odd-order images 304 and 305 of FIG. 3, they no longer cancel, resulting in the images 603 and 604 in the odd $\Omega_i$ of FIG. 6. As in the standard, non-chirped WGR of FIG. 2, most of the power is in $\Omega_0'$. Also, the WGR free-spectral range is reduced by a factor of two over the standard, non-chirped WGR.

Figure 7A:
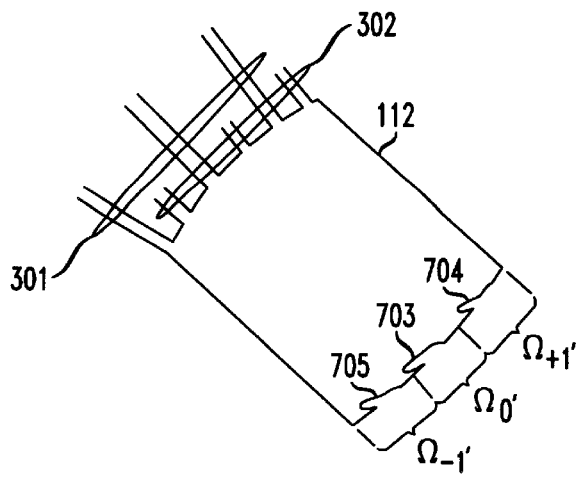
FIG. 7a shows the images from input line 2 at a free space region of a star coupler when all the odd-numbered grating arms are lengthened to include an additional 90° phase rotation and the even-numbered grating arms are removed.
Figure 7B:
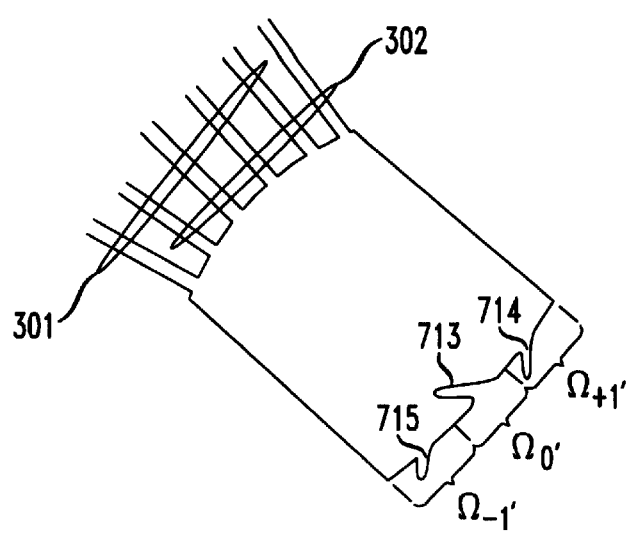
FIG. 7b shows the combined images from FIG. 4 and FIG. 7a at the free space region of a star coupler when all the odd-numbered grating arms are lengthened to include an additional 90° phase rotation.

As previously noted, if the same single-wavelength signal enters an input port associated with input line 2, which is spaced by the width of one W' from the input port associated with line 1 in star coupler 111, it would also be imaged to $\Omega_0'$ in the free space region 114 of star coupler 112. In this example, however, it is the images of FIG. 3 that are rotated and those of FIG. 4 remain the same. The 90 degree rotated images of FIG. 3 are shown in FIG. 7a, by the images 703, 704 and 705 (in $\Omega_0'$, $\Omega_{+1}'$ and $\Omega_{-1}'$). Consequently, as shown in FIG. 7b, when a WGR 112 is formed having all of its grating arms 302 connected, the rotated images 703, 704 and 705 of FIG. 7a are combined with images 403, 404 and 405 of FIG. 4 to form the images 713, 714 and 715 (in $\Omega_0'$, $\Omega_{+1}'$ and $\Omega_{-1}'$). With joint reference to FIGS. 6 and 7b, note that the images 603 and 713 are the same, but the images 714 and 715 are 180° rotated from the images 604 and 605.

Returning to FIG. 1, the images out of WGR 110 are collected by the equal-length waveguides of array 130. Generally only images from $\Omega_0'$, $\Omega_{+1}'$ and $\Omega_{-1}'$ are connected since they contain almost all the image power. To better show the waveguide sets in FIG. 1, the WGR free-spectral range is 5 channel widths, with the 5th channel unconnected, as one can see from the gaps in the waveguide spacings. Thus, there are three output waveguides, each spaced by γ, for each wavelength channel 131–134 exiting coupler 112 of WGR 110 and entering coupler 122 of WGR 120. Thus as shown in FIG. 1, each of the groups of three waveguides 131–134 handle the wavelengths $\lambda_1$, $\lambda_2$, $\lambda_3$, and $\lambda_4$, respectively. A wavelength channel $\lambda_1$ entering input line 1 (or input line 2) can be switched to either output line 1 (or output line 2) by controlling the relative phases (via phase shifters 140) between the three connecting waveguides for that channel. For example, channel $\lambda_3$ which connects via waveguides 133 to phase shifter array 140 has its phase shift controlled by appropiate phase shifter elements of phase shifter array 140. Essentially, each wavelength channel has its own generalized Mach-Zehnder interferometer, consisting of the WGRs 110 and 120 and the connecting waveguides of arrays 130 and 130' for that channel.

Each of the 12 phase shifter elements of array 140 are made to have a controllable phase shift which can be switched between a first value and a second value. The first phase value (e.g., typically about zero) enables the desired wavelength channel received from input line 1 at WGR 110 to be outputted at output line 1 of WGR 120. The second phase value (e.g., typically provides about 180° phase shift) enables the desired wavelength at input line 1 of WGR 110 to be outputted at output line 2 of WGR 120.

Since the operation of the WDM unit 100 is symmetrical about the middle line 190, the operation of WGR 110, waveguide unit 130 and left-half of phase shifter array 140 operates the same as the right-half of phase shifter array 140, waveguide unit 130' and WGR 120. As a result, if the images of wavelength $\lambda_1$ of input line 1 are made to look like images of wavelength $\lambda_1$ of input line 2, they are outputted by WGR 120 to output line 2. In this manner in a 2 line WDM 100, a wavelength channel from one input line can be switched to another output line and vice-versa. In a more general P line WDM implementation, where P=2, a wavelength channel $\lambda_1$ from line 1 can be switched to an adjacent line 2, a wavelength channel $\lambda_1$ from line 2 to line 3 etc. The wavelength channel $\lambda_1$ of the Pth line can be switched to line 1.

Obviously if a plurality of wavelengths $\lambda_i$ of input line 1 are to be switched from output line 1 to output line 2 then the corresponding phase shift elements in unit 140 associated with those plurality of wavelengths $\lambda_i$ must be switched to the second phase value.

The phase shifter elements in array 140 can be made controllable using an electrical signal, optical signal, or temperature, e.g., 149, to control an optical index of refraction of the associated phase shifter element and thereby change the effective length of that phase shifter element.

The WDM cross-connect design of FIG. 1 can be expanded to the case of P lines×P lines by employing an interleave chirp in the WGRs 110 and 120 that creates P images in each $\Omega_i$ with enough connecting waveguides to collect all the images. The interleave chirp for values of P up to 8 is given in Table 1 shown in FIG. 14. The values on the right side of the table give the additional path length in terms of $\lambda_c$ to add to each arm, the series repeating itself until the last arm is reached. For example, for P=4 every fourth arm of the WGRs is given an additional path length of $\lambda_c/2$. By adjusting the phase shifter elements in the connecting waveguides, one can switch any channel in any line to any other line, in, however, a cyclical fashion. For example, for P=3, if one switches channel 1 in line 1 to line 2, then channel 1 in line 2 necessarily switches to line 3, and channel 1 in line 3 necessarily switches to line 1. One cannot exchange channels between lines without affecting that same channel in the other lines. If one requires this functionality, one can build it out of an array of P=2 devices using, for example, a well-known Banyan network [e.g., see the article by L. Goke and G. Lipovski, "Banyan Networks for partitioning multiprocessor systems," 1st Int. Symp. on Computer Arch., (1972)].

Switching via a phase shifter unit 170 having connecting waveguides of nominally equal lengths has three significant benefits. First, the dominant loss in WGRs is due to radiation outside of $\Omega_0$ as described in the previously-referenced article by C. Dragone, "Optimum design of a planar array of tapered waveguides," J. Opt. Soc. Am. A, vol. 7, pp. 2081–2091 (1990). The loss is especially high near the edges of $\Omega_0$; this portion of $\Omega_0$ is often even discarded, as discussed in the previously-referenced article by K. Okamoto et. al. In the interleave cross-connect, the addition of connections in $\Omega_{-1}$ and $\Omega_{+1}$ significantly reduces the losses.

Second, a well-known limitation of the two-arm Mach-Zehnder as a switch is sensitivity to the exact power splitting ratios of the two couplers. This, for example, limited the switching extinction ratio of the add/drop arrangement described in the Okamoto et. al. article, requiring a series of Mach-Zehnders in order to improve the extinction. However, by having three or more arms per wavelength channel in the interferometer, as in the interleave cross-connect of FIG. 1, one can always adjust the phases so as to have exactly zero power in one port provided that the sum of the powers in the arms with the lowest powers is greater than the power in the third. In other words, one can always form a triangle from three segments provided that the sum of the lengths of the shorter two segments is greater than the third. For connecting waveguides to Brillouin zones $\Omega_{-1}'$, $\Omega_0'$, and $\Omega_{+1}'$, this is generally the case. A similar argument holds for the case of more than three arms. Thus even if there are fabrication imperfections, the phase shifters can be adjusted to correct for them. This tolerance is especially useful for designs in media with small waveguide dimensions, such as Indium Phosphide (InP). It should be noted that the WDM cross-connect may also be implemented as part of a silica integrated circuit.

Figure 8:
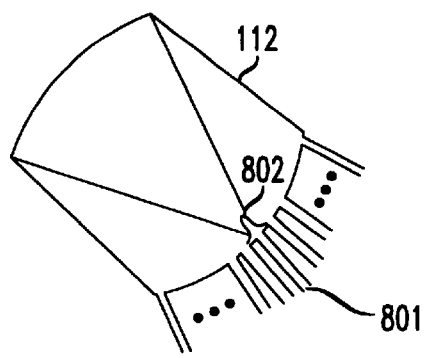
FIG. 8 shows the free space region of a star coupler having one waveguide for coupling each wavelength image to the phase shifter unit.

Third, in the proposed device, one can use multiple connecting waveguides in each $\Omega_i'$ for each wavelength channel. With reference to FIG. 8 there is shown an arrangement wherein only one waveguide 801 is used to connect to each wavelength channel image 802 in each $\Omega_i'$ from coupler 112.

Figure 9A:
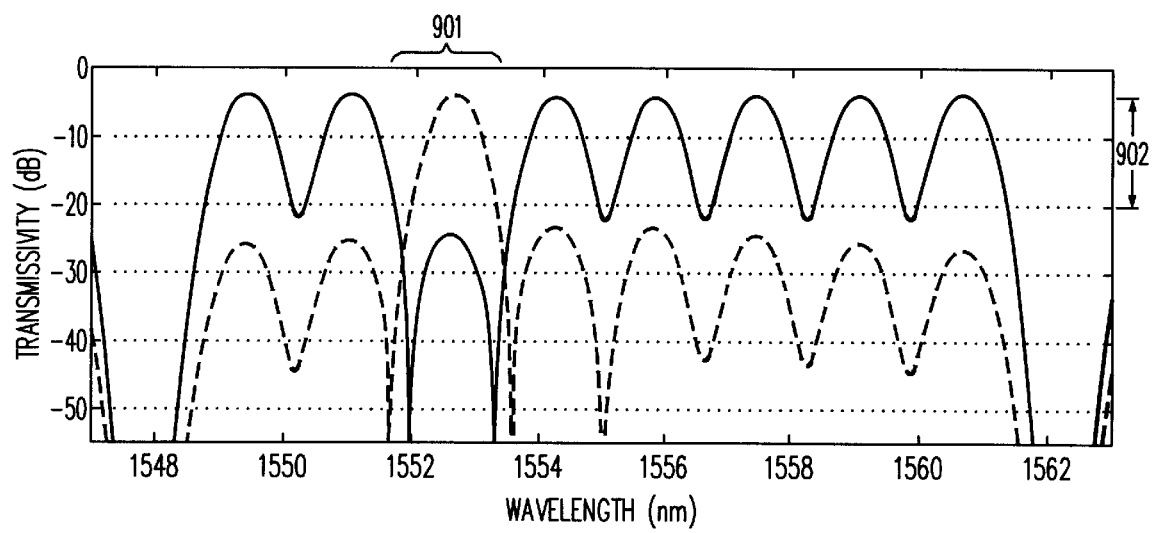
FIGS. 9(a) and 9(b) show the transinissivity of different embodiments of the arrangement of FIG. 8.
Figure 9B:
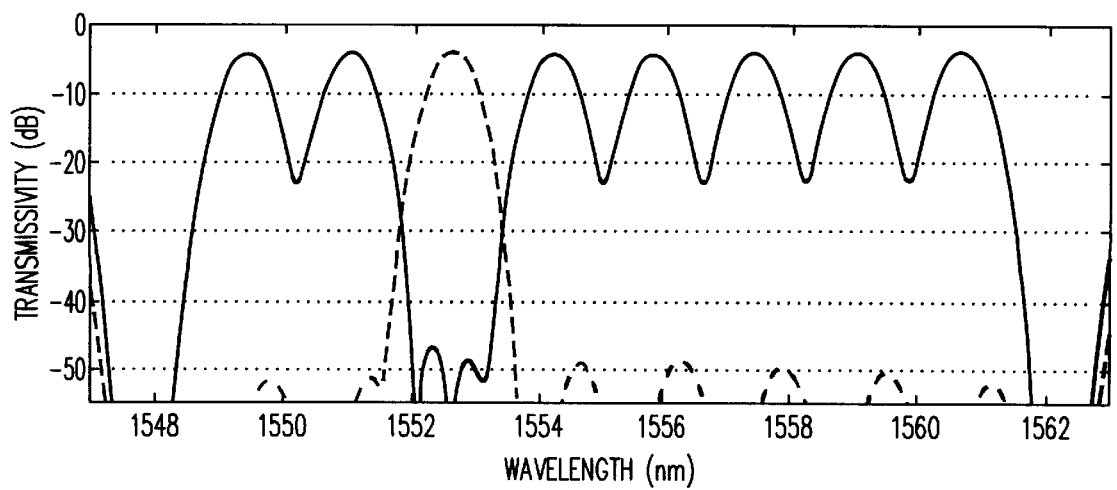

FIG. 9 shows for the arrangement of FIG. 8, the illustrative transmissivity from input line 1 to output line 1 (solid line) and input line 1 to output line 2 (dashed line) of the WDM interleave cross-connect 100 of FIG. 1. In FIG. 9(a) all connecting waveguide path lengths are equal, except for channel 3, see 901, which has a length long enough to produce the required extra 90° phase shift. In FIG. 9(b) the channel 3 connecting path length is adjusted to achieve best switching extinction ratio. As one can see, the switching extinction ratio in FIG. 9(a) is only ~20 dB. Thus the optimum switching extinction ratio does not occur when the connecting waveguides have exactly the same path length, which is because there is non-negligible power lost to $\Omega_{-2}'$ and $\Omega_{+2}'$.

FIG. 9(b) shows that for the best switching extinction ratio, the length of the channel 3 waveguide needs to be somewhat more or less than the length needed for an extra 90° phase shift. In FIG. 9(b), the phase shifters for the images from $\Omega_0'$, $\Omega_{+1}'$, and $\Omega_{-1}'$ have been adjusted to maximize the switching extinction ratio (i.e., a triangle made of the phases in the three arms was formed). The extinction ratio is limited by the sidelobes of the WGR response.

Figure 10:
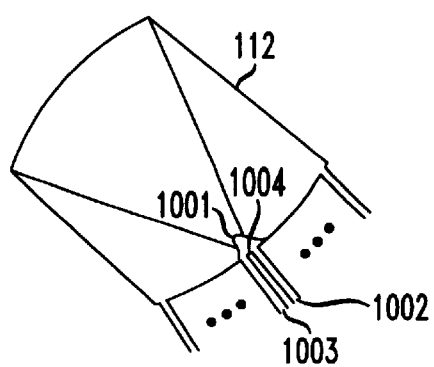
FIG. 10 shows the free space region of a star coupler having two waveguides for coupling each wavelength image to the phase shifter unit.

With reference to FIG. 10 there is shown an arrangement where two waveguides 1002 and 1003 are used to connect to each wavelength channel image 1001 in each $\Omega_i'$ from coupler 112. The widths of the connecting waveguides 1002 and 1003 are narrowed along with the spacing between them in order to enhance their mutual coupling to each $\Omega_i'$ image. Thus, assuming that only the Brillouin zones $\Omega_{-1}'$, $\Omega_0'$, and $\Omega_{+1}'$ are used for each wavelength, then each of the waveguide groupings 131–134 would contain 6 waveguides (two for each image in $\Omega_{-1}'$, $\Omega_0'$, and $\Omega_{+1}'$) As shown in FIG. 10, while the image 1001 is focused on the region 1004 between the waveguides 1002 and 1003, a portion of the image is still coupled to the waveguides 1002 and 1003.

Figure 11A:
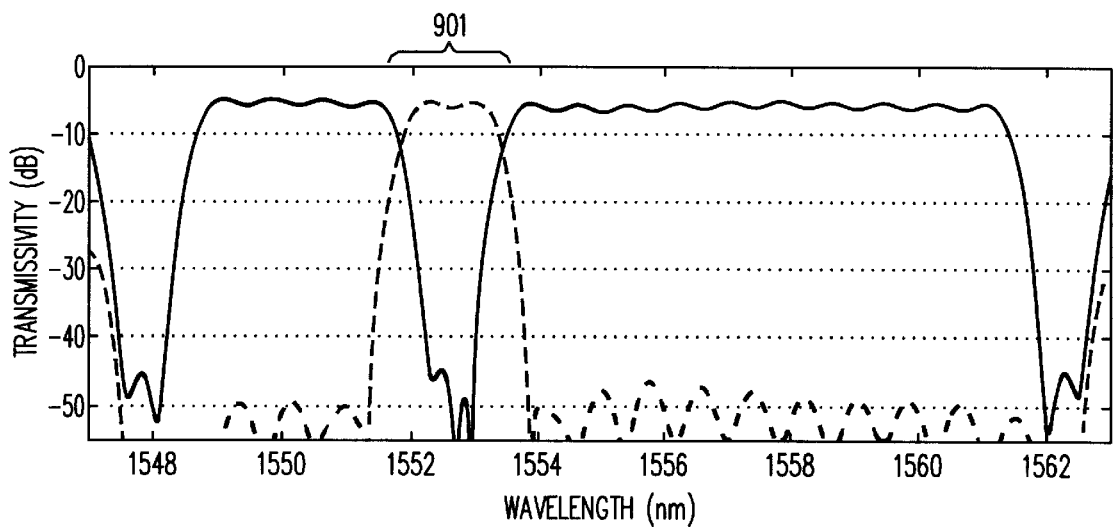
FIGS. 11(a) and 11(b) show the transmissivity of different embodiments of the arrangement of FIG. 10.
Figure 11B:
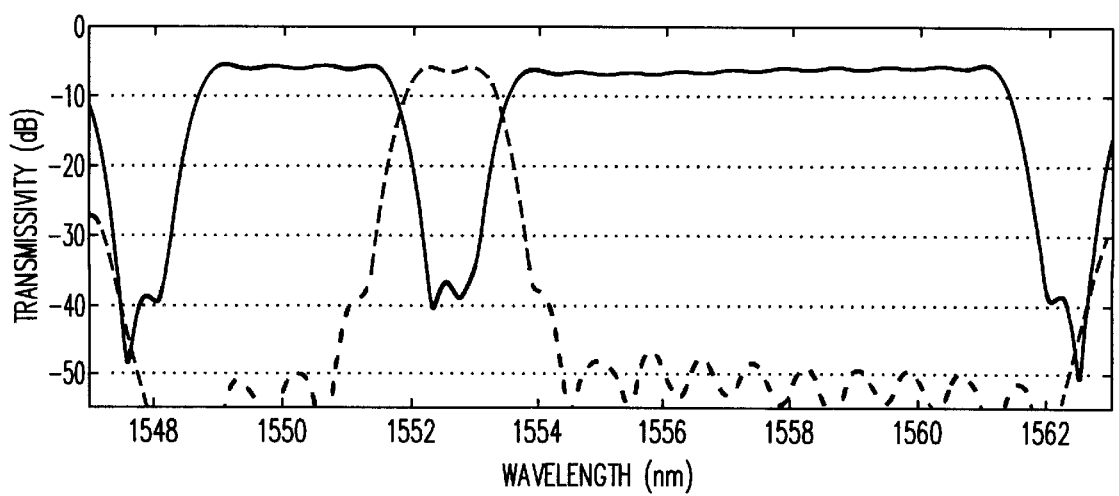

FIG. 11(a) shows, for the arrangement of FIG. 10, the illustrative transmissivity from input line 1 to output line 1 (solid line) and input line 1 to output line 2 (dashed line) of the WDM interleave cross-connect 100 of FIG. 1. In FIG. 11(b) an additional defocusing chirp is added to both the WGRs, 110 and 120, in order to increase the flatness at the tops of the passbands.

Figure 12:
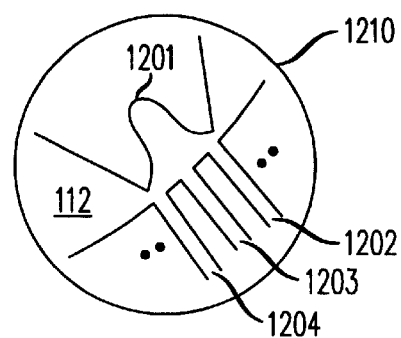
FIG. 12 shows the free space region of a star coupler having three waveguides for coupling each wavelength image to the phase shifter unit.

With reference to FIG. 12 there is shown a close-up of a region 1210 of coupler 112 of WGR 110 of FIG. 1. As shown, this arrangement uses three waveguides 1202, 1203 and 1204 to connect to each wavelength channel image 1201 in each $\Omega_i'$ from coupler 112. Again the widths of the connecting waveguides 1202–1204 are narrowed along with the spacing between them in order to enhance their mutual coupling to each $\Omega_i'$ from coupler 112. It should be noted that both the widths and spacings of the waveguides 1202–1204 of FIG. 12 are less than the widths and spacings of the waveguides 1002–1003 of FIG. 10.

Returning to FIG. 12, assuming that only the Brillouin zones $\Omega_{-1}'$, $\Omega_0'$, and $\Omega_{+1}'$ are used, we connect waveguides to $\Omega_{-1}'$, $\Omega_0'$, and $\Omega_1'$, resulting in three connecting waveguides per wavelength channel. Then each of the waveguide groupings 131–134 of FIG. 1 would contain 9 waveguides (three for each $\Omega_{-1}'$, $\Omega_0'$, and $\Omega_{+1}'$). While the image 1201 is focused on the waveguide 1203, a portion of the image is still coupled to the waveguides 1202 and 1204. While not illustrated, the transmissivity from input line 1 to output line 1 and input line 1 to output line 2 of the arrangement of FIG. 12 would be similar to that shown in FIGS. 11a and 11b, but have a somewhat more rectangular passband that has a higher extinction ratio.

Thus by careful design, the coupling between the star-coupler 112 and the one or more waveguides of array 130 used for each channel may be a rectangular passband with very low excess loss as described in the previously-referenced U.S. Pat. No. 5,488,680. If necessary, residual passband ripple, e.g., 902 of FIG. 9, can be smoothed out by moving the port waveguides out of focus, which can be done either physically or by chirping the WGRs with the function $\epsilon[m-(M+1)/2]^2$ added to the arm length distribution, where $\epsilon$ is a small number with units of length giving some additional loss. Such an approach is described in the article by C. R. Doerr, M. Shirasaki, and C. H. Joyner, "Chromatic focal plane displacement in the parabolic chirped waveguide grating router," IEEE Photon. Technol. Lett., vol. 9, pp. 625–627 (1997). To minimize the number of phase shifter contacts, each waveguide group can be placed under a single contact.

Finally, a design with integrated connecting waveguides prevents the random performance fading due to multipath interference that can occur in large networks containing back-to-back multiplexers connected by fibers, as described in the article by E. L. Goldstein and L. Eskildsen, Scaling limitations in transparent optical networks due to low-level crosstalk, IEEE Photon. Technol. Lett., vol. 7., pp. 93–94 (1995).

Figure 13:
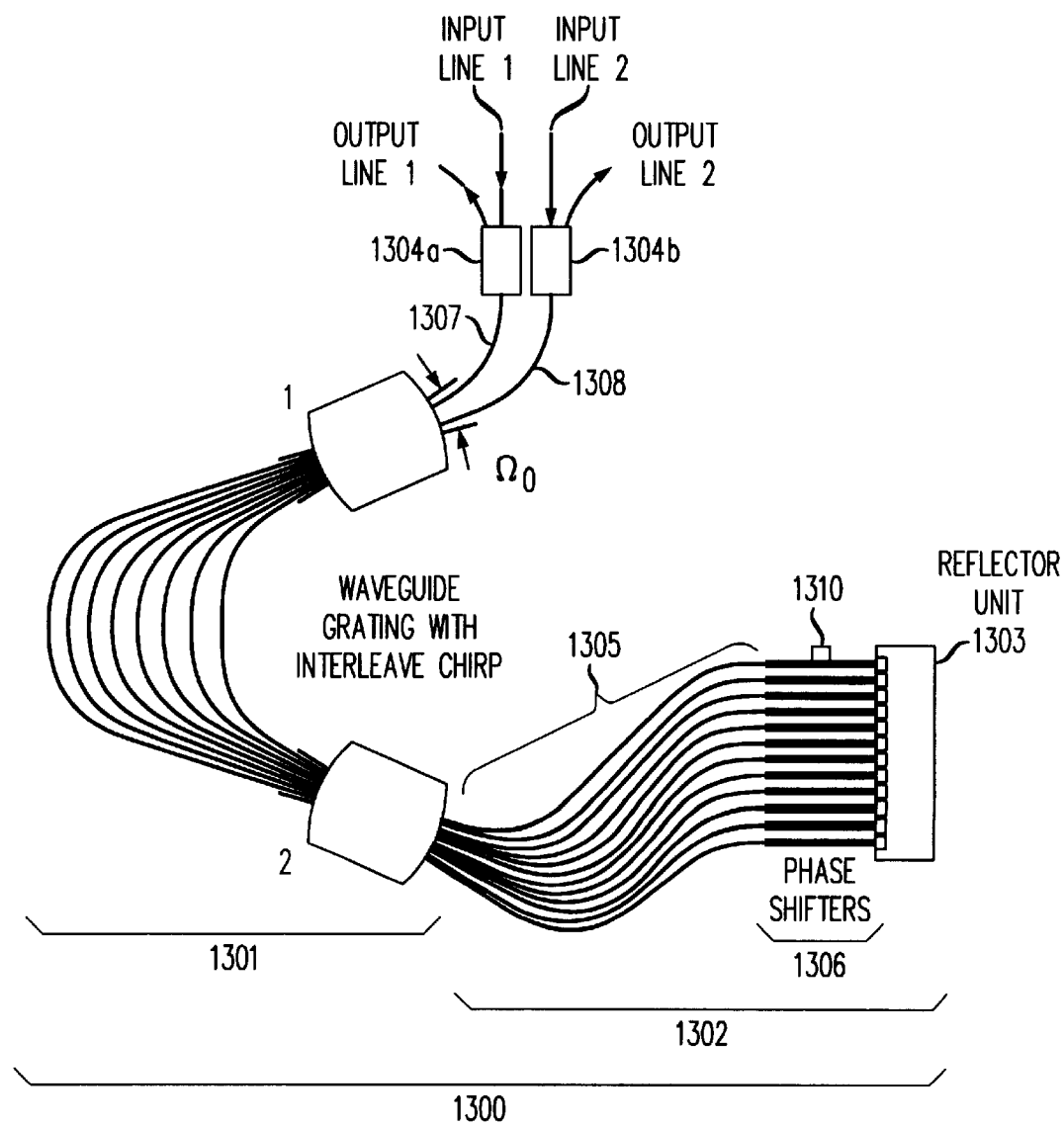
FIG. 13 shows an illustrative diagram of a reconfigureable WDM crossconnect comprising a "interleave-chirped" WGR, a phase shifter unit, a reflector unit, and couplers.

Shown in FIG. 13 is an illustrative diagram of a reconfigureable wavelength-division-multiplexing (WDM) cross-connect 1300 comprising an "interleave-chirped" waveguide grating router (WGRs) 1301, a phase shifter unit 1302, a reflector unit 1303 and couplers 1304a and 1304b. Since the WDM cross-connect 100 is symmetric about the axis 190, the WDM cross-connect 1300 may be formed by cutting WGR 110 in half, at axis 190, and placing a reflector unit at the axis 190 location. The resulting WDM cross-connect 1300 includes the left-half of FIG. 1 including WGR 110, the waveguide array 130 and the left-half of phase shifter array 140, i.e., up to line 190. The operation of the WGR 1301 is the same as that of WGR 130. The operation of phase shifter unit 1302 is the same as that of the left-half of waveguide array 130 and one-half of phase shifter array 140. Thus, the phase shift provided by phase shifters 1306 is only one-half of that provided by phase shifter array 140 of FIG. 1.

The signals from input lines 1 and 2 are coupled via couplers 1304 to WGR 1301. After the wavelength images are demultiplexed and processed by WGR 1301 and pass through the waveguides 1305 and phase shifters 1306 they are reflected by reflector unit 1303. After reflection, the wavelength images obtain another phase shift from phase shifter 1306 (the two phase shifts of phase shifters 1306 equals the phase shift of phase shifters 140). The wavelength images then pass through waveguides 1305, are multiplexed by WGR 1301, outputted at either port 1307 or 1308, and then coupled via the appropriate coupler unit 1304a or 1304b to output line 1 or 2, respectively. If the phase shift of phase shifters 1306 are set at a first value (about zero) for one or more wavelengths of a signal from input line 1 (input line 2) these one or more wavelengths are outputted on output line 1 (output line 2), while if the phase shift of phase shifters 1306 are set at a second value (about 90°) for one or more wavelengths then these one or more wavelengths are outputted on output line 2 (output line 1). Note that since the images pass twice through phase shifters 1306, phase shifters need only be shifted by one half the amount that is needed by phase shifter array 140. Again the phase shift of phase shifters 1306 are controlled by electrical or optical signals 1310 to each of the phase shifters 1306.

Figures 14, 15:
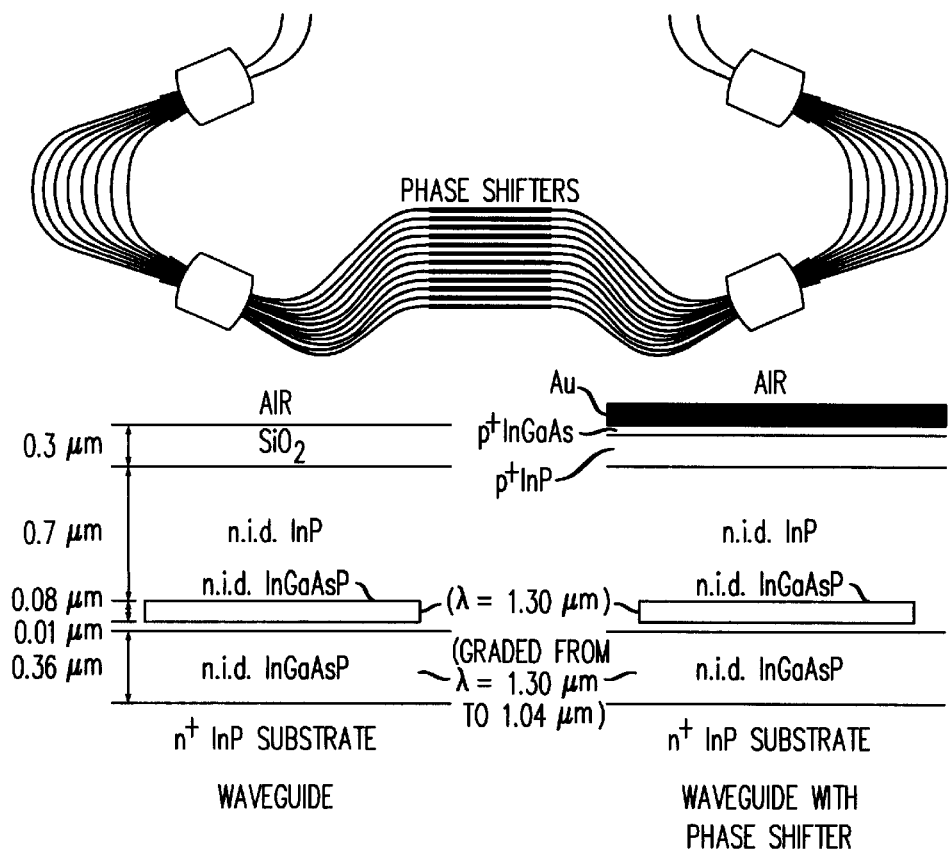
FIG. 14 shows a table illustrating the grating arm changes to apply to WGRs when the number of lines P varies from 2 through 8.
FIG. 15 shows an illustrative implementation of a waveguide and a waveguide with phase shifter.

FIG. 15 shows an illustrative implementation of a waveguide and a waveguide with phase shifter. More particularly, FIG. 15 shows a 2 line×2 line, 6-channel×200 GHz spacing cross connect in InP. $M_1=M_2=30$, and the WGRs have free-spectral-ranges of 7×200 GHz. The connecting waveguides are connected to $\Omega_{-1}'$, $\Omega_0'$, and $\Omega_1'$ for each channel ($?_i'$ are the Brillouin zones of the star couplers in the WGR), resulting in a total of 3×6=18 connecting waveguides. To account for any relative wavelength shift between the two WGRs, several ports were included at each line connection. The waveguides have a normalized transverse index step of 0.85%, and the bend radius is 620 µm. The dimensions of the entire device is about 4.2×9.5 mm$^2$.

The waveguide structure is a buried rib as shown in FIG. 15. First, the slab and rib were grown, then the waveguides were wet-etched into the rib. Undoped InP was grown on top. Then a protective layer of SiO$_2$ over the waveguides and between the phase shifters (SiO$_2$ width of 33 µm) was applied. Then a p-doped layer was grown over the phase shifters, and finally gold contacts (52 µm wide) were deposited on the phase shifters. The phase shifters are 1.4 mm long, spaced by 85 µm, and aligned to the (110) direction.

Figure 16:
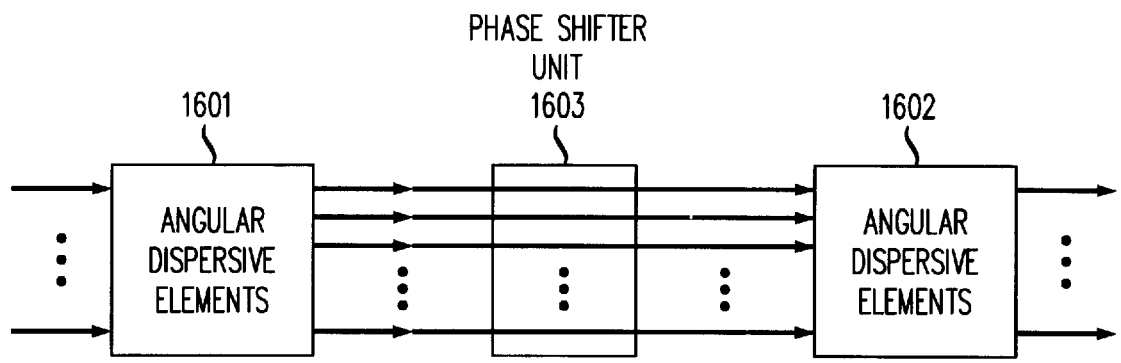
FIG. 16 shows a more generalized illustrative diagram of a reconfigureable WDM cross-connect comprising two groups of angular dispersive elements connected by a phase shifter unit.

While the present invention has been described in FIG. 1 as using WGR, e.g., 110 and 120, it should be understood that the units 110 and 120 may be implemented using other types of angular dispersive elements. FIG. 16 shows a more generalized illustrative diagram of a reconfigureable wavelength-division-multiplexing (WDM) cross-connect of the type shown in FIG. 1 which is implemented using two groups of angular dispersive elements 1601 and 1602 connected by a phase shifter unit 1603. The angular dispersive elements 1601 and 1602 may be implemented using a virtually imaged phase array (VIPA) as described in the article by M. Shirasaki entitled "Large angular dispersion by a virtually imaged phase array and its application to a wavelength demultiplexer", OPTICS LETTERS, Vol. 21, No. 5, March 1996. Another type of angular dispersive element which may be used is a well-known reflecting grating. It should be noted that the phase shifter 1603 of FIG. 16, as well as the phase shifter unit 140 of FIG. 1, may be implemented in a well-known manner using free space optics.

Figure 17:
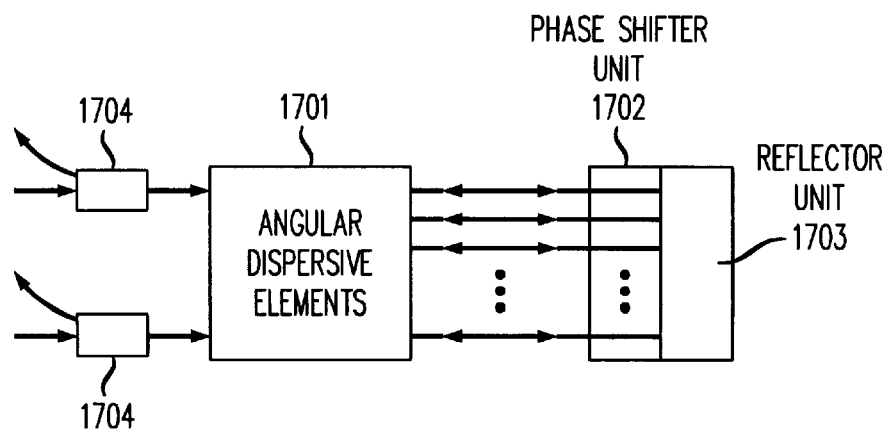
FIG. 17 shows an illustrative diagram of a reconfigureable WDM crossconnect comprising an angular dispersive elements unit, a phase shifter unit, a reflector unit, and couplers.

It should also be noted that because of the symmetry of FIG. 16, a reflector unit may be used to replace the right half of FIG. 16, in the same manner as shown and described in FIG. 13. FIG. 17 shows such an arrangement of a reconfigureable WDM cross-connect comprising an angular dispersive elements unit 1701, a phase shifter unit 1702, a reflector unit 1703, and couplers 1704. The WDM cross-connect of FIG. 17 operates in essentially the same manner as the WDM cross-connect previously discussed for FIG. 13. Signals inputted at couplers 1704 enter one or more selected ports of the angular dispersive elements unit 1701 and phase shifter unit 1702 and are reflected back through the phase shifter unit 1702 and angular dispersive elements unit 1701 and, with the appropriate value set in particular phase shifter(s) of phase shifter unit 1702, the reflected signals may be outputted from one or more selected ports of the angular dispersive elements unit 1701 to an output line via couplers 1704.

Figure 18:
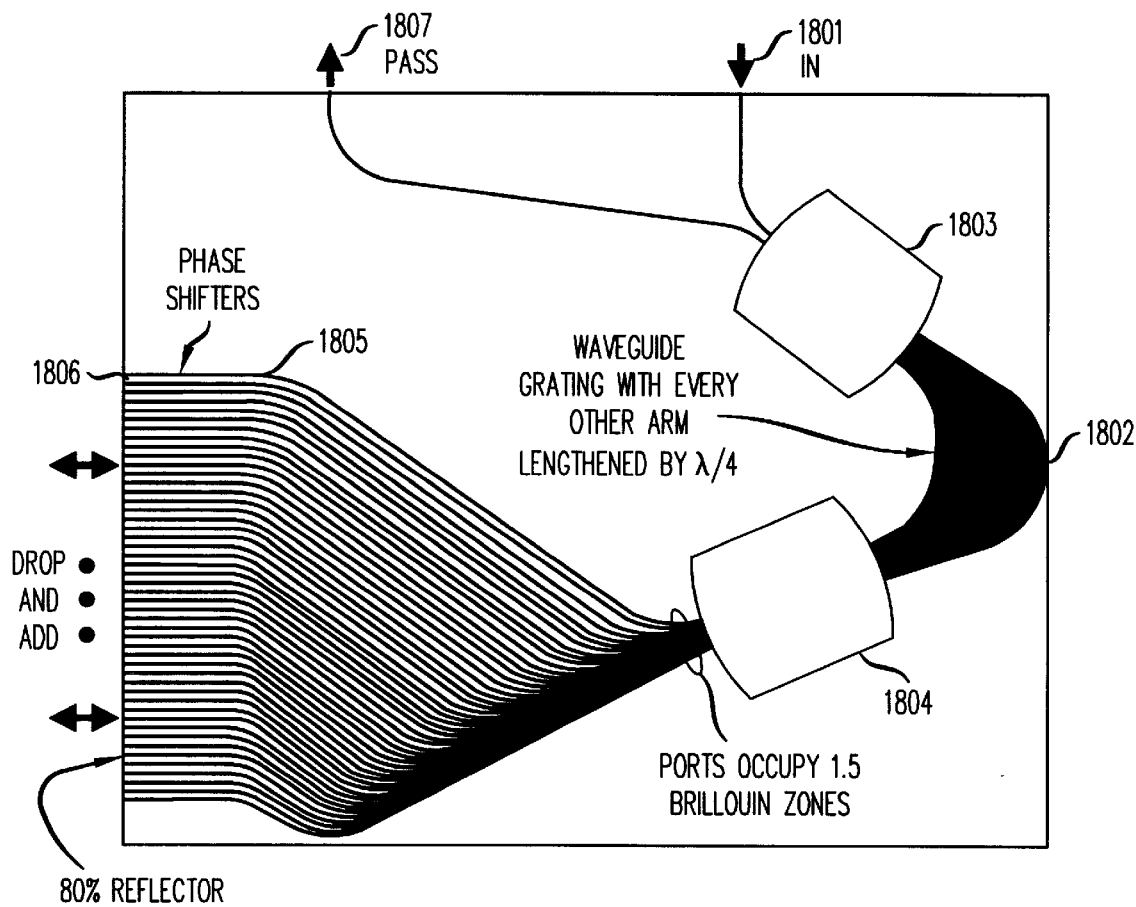
FIG. 18 shows a layout of a programmable add/drop device according to the present invention.

With reference now to FIG. 18 there it shows an add/drop device which is the subject of the present invention. As can be appreciated by those skilled in the art, while the previous discussion pertained to a WDM cross-connect, the present discussion centers on a add/drop device.

As those skilled in the art will quickly appreciate, it is desirable to have devices that can remove any number of wavelength channels from a wavelength-division multiplexed transmission line and provide the channels already demultiplexed to a dropping station. The device must be programmable such that the dropping station can choose at any time which channels to drop without affecting uninvolved channels. For integrated devices, designs have been demonstrated in silica and InP using waveguide grating routers (WGRs) and Mach-Zehnder switches. In contrast to these, our subject invention is based on an interleave chirped WGR.

With continued reference to FIG. 18, signals from a transmission line 1801 enter the in port and are sent to grating arms 1802 via star coupler . The WGR may advantageously be conventional with the exception that every other arm is shortened by λ/4, which is called the "interleave chirp". This causes each wavelength to create two images in each Brillouin zone of the star couplers. In the lower star coupler 1804, the two images plus the nearest image outside the center Brillouin zone for each channel are collected by waveguides. Thus, there are three collection waveguides per channel, with all the collection waveguides equal in length. The signals then pass through the phase shifters 1805, reflect off the partially reflecting mirror 1806 and reenter the grating. They are then sent either back to the in port 1801 or to the "pass" port or some combination thereof, depending upon the phase shifter settings. Since there are three phase shifters per channel, one can always perfectly null the signal being sent to one of the ports provided that the sum of the powers in the two lower-power ports is greater than that in the third. Channels are dropped by nulling them in the pass port.

The portions of the signals that pass through the partial reflector 1806 can be coupled into fibers (not shown). These signals can advantageously be measured as dropped channels. Likewise, channels can be added by sending external signals through the partial reflector 1806. Since there are three ports for each channel to choose from, one would ordinarily choose the port closest to the Brillouin zone center as the drop port, and the second closest as the add port.

Note that this device varies from a conventional add/drop in that all the channels are always available at the drop ports whether they are actually removed from the line or not. Thus the device can also be used to perform network monitoring functions or as a sensor for gain equalization.

As those skilled in the art will quickly appreciate, the advantages associated with my design are numerous. First, the interleave chirp allows for a reflective design without requiring a circulator nor care to minimize facet reflections. A reflective design in turn obviates the need for wavelength-aligning multiple WGRs, significantly reducing the device size and halves the necessary phase shifter turning current. Second, the fabrication of my device is simple, since it has no highly critical feature dimensions. Third, there are no waveguide crossings employed with my design. Finally, because some of the light that falls outside the central Brillouin zone of the second star coupler is collected, reduces the loss and makes the loss nearly the same for all channels.

An exemplary, 16-channel, 100-GHz channel-spacing device similar to that shown in FIG. 18 has been constructed using InP. The device utilized 76 grating arms, had a grating free-spectrum range of 18×100 GHz, and phase shifters 850 µm long with a spacing of 85 µm.

The fabrication of the device is straightforward. Specifically, the waveguides are wet-etched rib-loaded slabs buried in 0.7 µm of undoped InP, and the phase shifters have a p-doped layer grown on top, as shown by FIG. 15. To make a pristine surface to get the required uniform junction over the phase shifters, an InP cap layer was etched off of the p++ layer after patterning with 18 µm-wide openings and prior to metal evaporation. In order to increase the current confinement, the p-doped layer was etched down to 0.4 µm in a nonselective etch after applying the metals. Finally, a silicon chip containing gold strip lines was glued to the top of the device using conventional epoxy adhesive, wire bonded from the phase shifters to the gold strip lines, and then wire-bonded from the strip lines to a circuit board with a 50-pin connector.

The phase shifters can be tuned by either reverse voltage or forward current: +2π for +7mA. For reverse voltage, there is no crosstalk between phase shifters, but for forward current, there is some "neighbor heating". Because the three phase shifters for each channel are far apart in a 16-channel device, a small correction had to be applied to neighboring channels when reconfiguring using forward current. Nevertheless, only forward current was used so all 32 of the pins were connected to 32 computer-controlled current drivers, two for each channel, leaving the third floating.

Figure 19A:
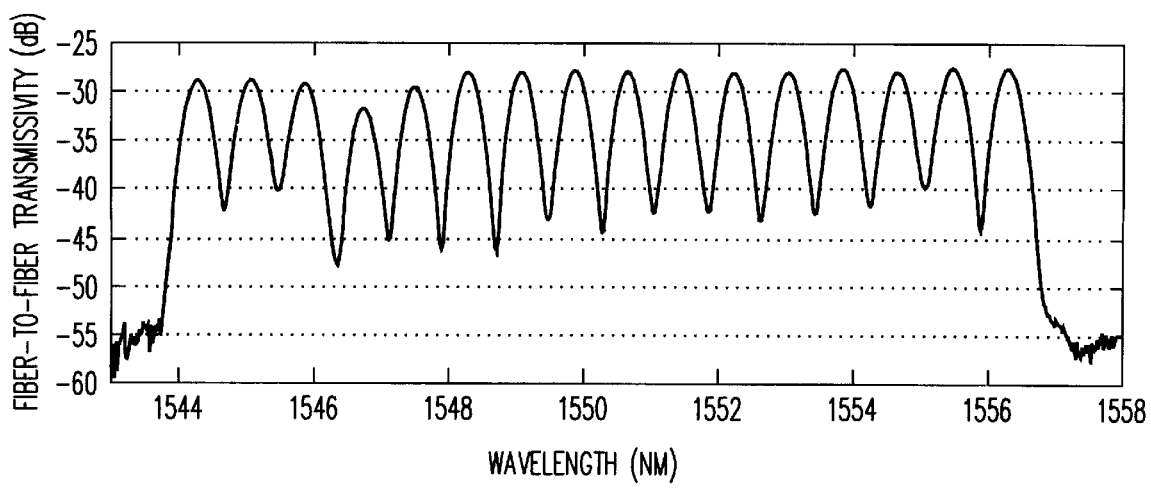
FIGS. 19(a) and 19(b) show the measured fiber to fiber transmissivity between an in port and a pass port for (a) all channels passed and (b) three channels dropped.
Figure 19B:
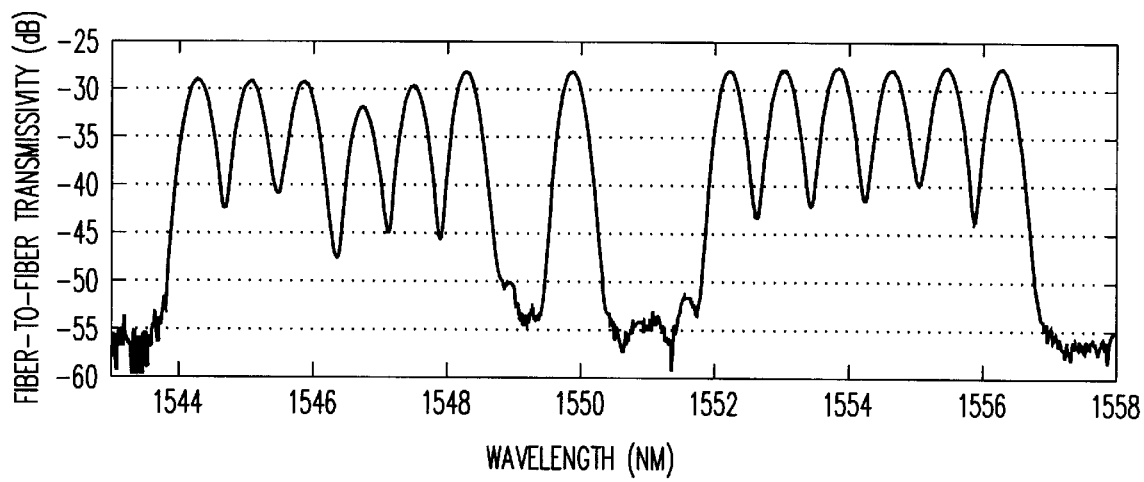
Figure 20:
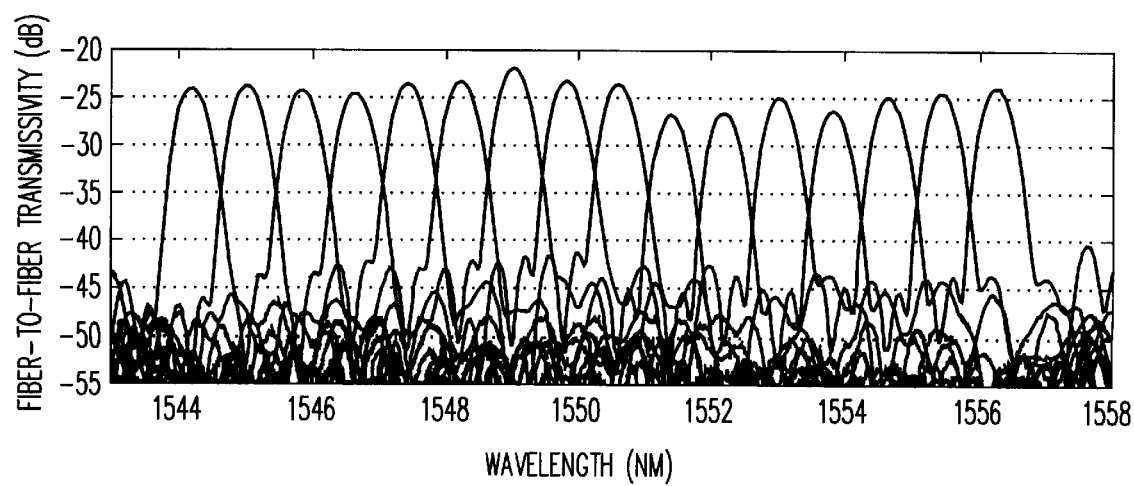
FIG. 20 shows the measured fiber to fiber transmissivity between the in port and sixteen of the add/drop ports.

FIG. 19 shows the measured fiber-to-fiber transmissivity for the TE polarization from the in port to the pass port showing (a) all channels passed and (b) three channels dropped. The current values ranged from 0 to 7.3 mA per phase shifter. FIG. 20 shows the measured transmissivities from the in port to 16 add/drop ports. The nonuniformities in the peak transmissivities in the figures are entirely due to imperfections at certain locations on the facet the 80% multilayer reflection coating. Also the high loss is mainly due to over-doping of p-layer in the phase shifters, which also caused the TM polarazation to exhibit even higher loss.

As can be further appreciated, several modifications can be made to improve the performance for certain applications. One modification is the insertion of a quarterwave plate with its birefringence axes at 45° to the circuit, between the partial reflector and the phase shifters. This modification eliminates any polarization dependence in the device for the passed channels.

Another modification is to include two or more collection waveguides per channel image in order to create excess-loss-free rectangular passbands for the passed channels. Each set of collection waveguides for each channel image can be grouped under a single phase shifter.

Yet another modification is to make the in port and the pass port the same waveguide and increase the relfectance of the partial reflector to one or more sets of the collection waveguides and change the interleave chirp (by using less or more than λ/4 length change) so that most of the power is sent to the collection waveguides with the lower partial reflectance.

The drop ports then couple to the ports of lower partial reflectance. The result is lower loss for the dropped or added ports. Finally, another modification is to make the device in a material such as silica or polymer and cut slots between the phase shifters (with, for example, a saw or laser). One could then consider tuning the phase shifters by using mechanical stress or strain. Also, one could remove the substrate under the "freed" phase shifters reducing the thermal loading and thus the required phase shifting power.

Thus, what has been described is merely illustrative of the application of the principles of the present invention. Other arrangements and methods can be implemented by those skilled in the art without departing from the spirit and scope of the present invention.

What is claimed is:

1. A Wavelength Division Multiplexing (WDM) programmable add/drop device comprising:
a waveguide grating router including:
a first coupler having at least an "in" port and a "pass" port at one end, whereby optical signals including one or more optical wavelengths enter the device through the "in" port and whereby optical signals including one or more optical wavelengths exit the device through the "pass" port; and a plurality of ports at an end other than the one end;
an interconnect unit including a plurality of waveguides substantially and uniformly increasing in path length except for an interleave chirp consisting of shortening or lengthening every other waveguide by a fixed amount L; the waveguides interconnecting the said plurality of ports of the first coupler to a plurality of ports of a second coupler; and
said second coupler having a plurality of ports at one end, and another plurality of ports at an other end, the second said plurality of ports receiving demultiplexed optical signals and there are two or more ports for each optical wavelength of interest:
a phase shifter unit optically connected to said waveguide grating router; said phase shifter unit including:
a plurality of phase shifter waveguides for interconnecting said second plurality of ports of said second coupler to a plurality of phase shifters; and
the plurality of phase shifters, each providing a tunable phase shift to the optical signals passing therethrough; and
a reflector unit optically connected to said phase shifter, said reflector unit including:
a partial reflector for reflecting optical signals back through said phase shifter unit and said waveguide grating router;
a means for coupling optical signals in to and out from the phase shifter waveguides through the partial reflector unit.

2. The WDM add/drop device of claim 1 wherein the "in" and "pass" ports are contained within the same waveguide.

3. The WDM add/drop device of claim 1 further comprising:
a quarter-wavelength plate with its birefringence axis at 45 degrees to the optical circuit is placed between the partial reflector and phase shifter unit.

4. The WDM add/drop device of claim 3 wherein the "in" and "pass" ports are contained within different waveguides.

5. The WDM add/drop device of claim 3 wherein said add/drop is implemented as part of a silica optical integrated circuit.

6. The WDM add/drop device of claim 3 wherein said add/drop is implemented as part of an indium phosphide integrated circuit.

7. The WDM add/drop device of claim 3 wherein cuts are made between the phase shifters.

8. The WDM add/drop device of claim 3 wherein the phase shifters are thermooptic.

9. The WDM add/drop device of claim 8 wherein cuts are made between the phase shifters, and the substrate is all or partially removed from underneath the phase shifters to reduce the thermal loading.

10. The WDM add/drop of claim 8 wherein the phase shifters tune via mechanical stress.

11. The WDM add/drop of claim 3 wherein L is equal to a quarter of a wavelength.

12. The WDM add/drop of claim 3 wherein the value of the partial reflectance is not the same for all phase shifter waveguides.

13. A Wavelength Division Multiplexing programmable add/drop device comprising:
a first unit including two or more wavelength demultiplexers that couple substantially equally to two one or more input ports, said first unit including:

a first coupler having at least an "in" port and a "pass" port at one end, whereby optical signals including one or more optical wavelengths enter the device through the "in" port and whereby optical signals including one or more optical wavelengths exit the device through the "pass" port, and a plurality of ports at an end other than the one end;

an interconnect unit including a plurality of waveguides substantially and uniformly increasing in path length except for an interleave chirp having every other waveguide shortened or lengthened by a fixed amount L and the plurality of waveguides interconnecting the plurality of ports of the first coupler to a plurality of ports of a second coupler; and said second coupler having a plurality of ports at one end, and another plurality of ports at an other end, the second said plurality of ports receiving demultiplexer optical signals and there are two or more ports for each optical wavelength of interest;

a phase shifter unit that carries optical signals to and from the demultiplexers of the first unit and a partial reflector unit; and the partial reflector unit which:

partially reflects the optical signals back to the first unit such that each reflected optical signal is directed back to a particular input port by the phase shifter; and partially transmits demultiplexed optical signals such that optical signals may be selectively added or dropped.

14. The Wavelength Division Multiplexing programmable add/drop device according to clam 13 wherein said phase shifter unit is optically connected to a waveguide grating router and includes:

a plurality of phase shifter waveguides for interconnecting said second plurality of ports of said second coupler to a plurality of phase shifters; and the plurality of phase shifters, each providing a tunable phase shift to the optical signals passing therethrough.

15. The Wavelength Division Multiplexing programmable add/drop device according to claim 14 further comprising:

a reflector unit optically connected to said phase shifter, said reflector unit including:

a partial reflector for reflecting optical signals back through said phase shifter unit and said waveguide grating router; and a means for coupling optical signals into and out from the phase shifter waveguides through the partial reflector.

16. The Wavelength Division Multiplexing programmable add/drop device according to claim 15 further comprising:

a quarter-wavelength plate positioned between the partial reflector and the phase shifter unit.

\* \* \* \* \*